Dec. 31, 1940.   F. W. THOROLD   2,226,954
APPARATUS FOR REGULATING THE DENSITY OF SOLUTIONS
Filed Jan. 21, 1937   2 Sheets-Sheet 1
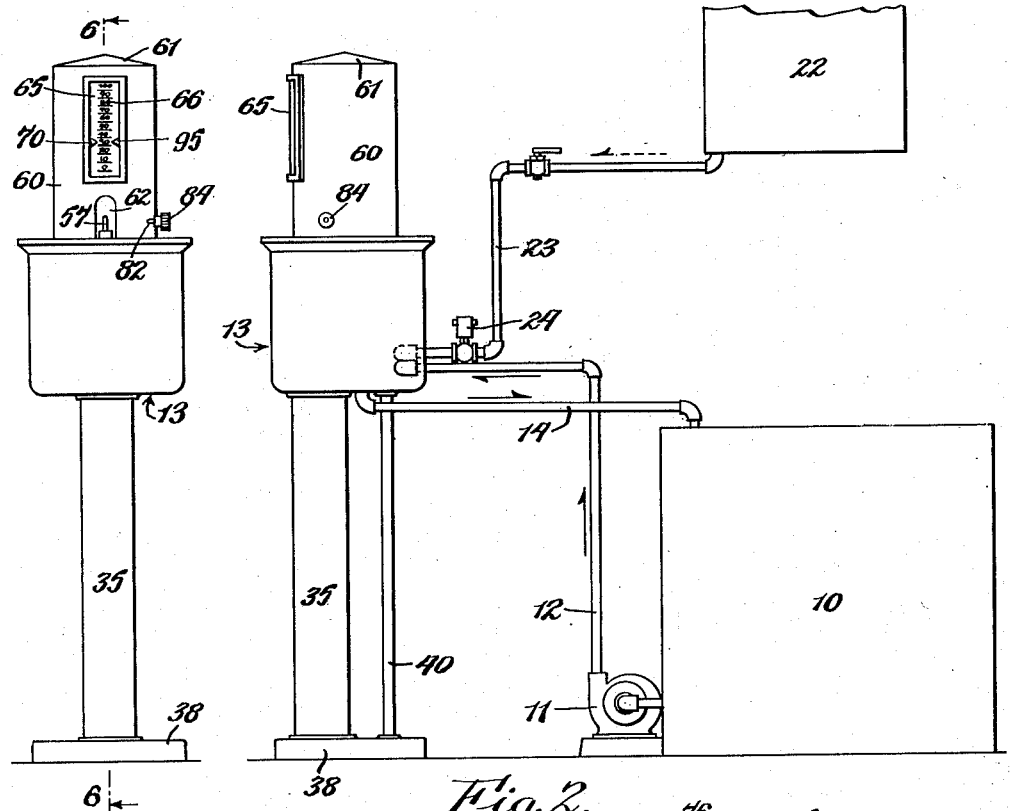
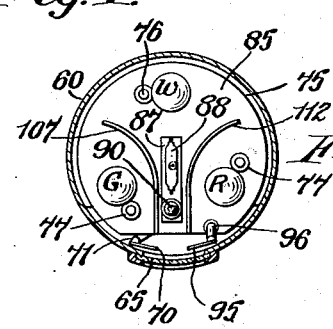
Fig. 1.
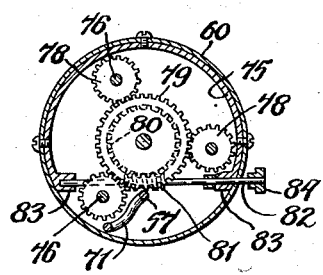
Fig. 4.
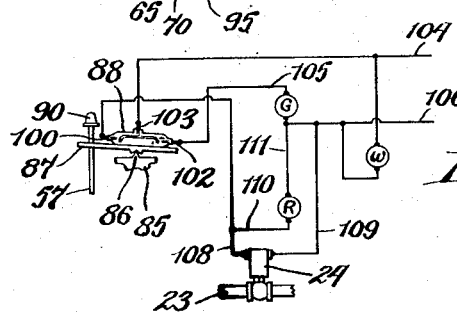
Fig. 5.
INVENTOR
Frederick Walter Thorold
BY Popps and Popps
ATTORNEYS

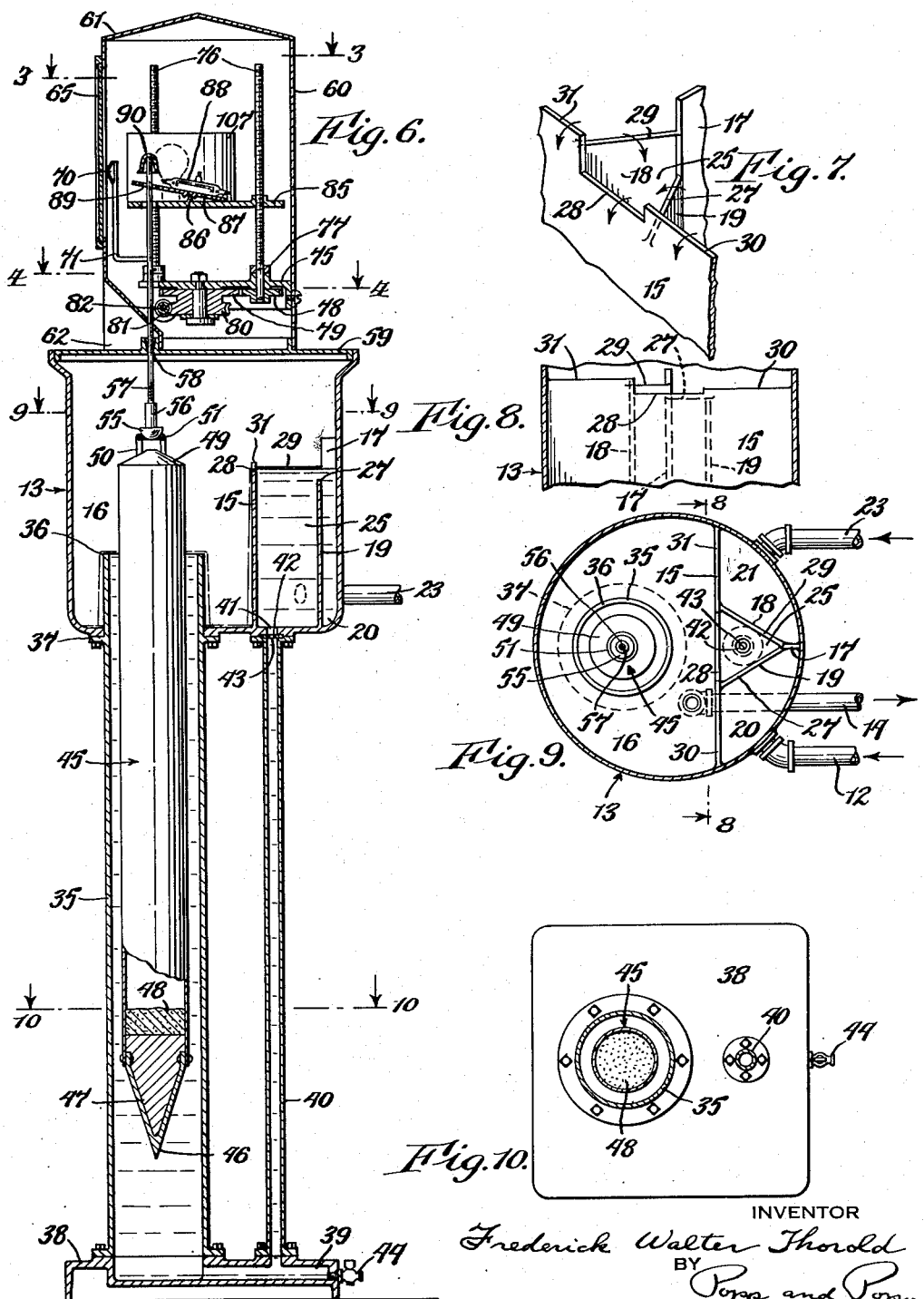

Patented Dec. 31, 1940

2,226,954

UNITED STATES PATENT OFFICE 2,226,954

APPARATUS FOR REGULATING THE DENSITY OF SOLUTIONS

Frederick Walter Thorold, Niagara Falls, N. Y.

Application January 21, 1937, Serial No. 121,548

16 Claims. (Cl. 137—78)

This invention relates to apparatus for maintaining the strength of solutions and more particularly to an apparatus responsive to the specific gravity of a solution being used and which, when the strength of the solution drops below that which the apparatus is set to maintain, admits a highly concentrated solution to bring it back to strength. In the following description it will be assumed that the apparatus is employed for maintaining a constant strength of a brine solution, but it will be understood that the invention has a much wider application and can be used wherever it is desired to maintain a constant strength solution through its specific gravity. Particularly in the food industry it is highly important that the strength of the brine solutions employed be maintained within very close limits. For example, in the quality grading of peas, such as in the apparatus shown in my copending application Ser. No. 26,581, filed June 14, 1935, for Method and apparatus for grading articles, peas are introduced into a brine solution of such strength that the inferior hard peas sink and the light tender peas rise, this permitting of their separation. The difference in the specific gravity of the hard and soft peas is very slight and consequently it is necessary to maintain the brine solution at a definite strength. The peas absorb salt in going through the quality grader and other factors tend to reduce the strength of the brine solution.

It is the principal object of this invention to provide a simple and accurate apparatus for maintaining the strength of solutions which undergo either dilution or concentration in use and which will maintain the strength of such solution within very close limits.

Another object of the present invention is to provide such apparatus in which the solution to be reinforced with a stronger solution flows past a hydrometer at a constant and uniform rate so that the hydrometer can be employed to accurately control the admission of reinforcing solution and is not subject to the varying influence of different rates of flow.

Another object of the present invention is to provide a hydrometer so controlling the strength of a brine solution which is of such weight and volume that its buoyancy is not appreciably affected by the flow of the solution in which it is immersed nor by small weights placed upon it.

Another aim of the present invention is to porvide such apparatus in which only a fraction of the reinforcing solution is admitted to the stream passing the hydrometer, the balance being discharged into the solution needing reinforcement at a point other than the inlet to the hydrometer tube. By this means the apparatus is made much more sensitive and excessive hunting is avoided especially where it is necessary to admit large quantities of the concentrated solution to bring the solution needing reinforcement back to strength.

Another aim is to provide such an apparatus in which an excess of the solution to be reinforced is passed through the apparatus so as to insure an overflow maintaining a constant head for the solution in the hydrometer tube and thereby insure a uniform flow and exact operation of the hydrometer in the tube.

Another purpose of the present invention is to provide a simple and reliable electrical control which is actuated by the hydrometer and serves to control the admission of the reinforcing solution.

Another purpose is to provide such an electrical control which is conveniently adjustable so that the apparatus can be quickly adjusted to maintain any desired strength of solution.

Another purpose of the invention is to provide such an apparatus in which indicating means are provided for showing both the strength of the solution which the apparatus is set to maintain and the strength of the solution passing therethrough so that the operator can see, at a distance from the apparatus, the conditions under which the apparatus is working.

Another purpose of the invention is to provide such a control apparatus which includes lights of different colors operated in alternation, a red light being preferably employed to indicate that the solution is below strength and a green light being preferably employed to indicate that the solution is at strength.

Another aim of the invention is to provide such apparatus in which the flows of the relative amounts of reinforcing solution and solution to be reinforced, through the hydrometer tube and through the apparatus without passing through the hydrometer tube, are controlled by a simple series of overflow dams or weirs.

Other objects are to provide such apparatus which is extremely simple and compact in construction; is sensitive in its operation and will stand up under conditions of severe and constant use without getting out of order.

In the accompanying drawings:

Fig. 1 is a front elevation of a salinometer embodying my invention.

Fig. 2 is a side elevation showing the manner in which the salinometer is connected to a tank containing the solution to be reinforced and to a tank containing the reinforcing solution.

Figs. 3 and 4 are horizontal sections, taken on the correspondingly numbered lines on Fig. 6.

Fig. 5 is a wiring diagram of the electrical control circuit.

Fig. 6 is a vertical section, taken on line 6—6, Fig. 1.

Fig. 7 is a fragmentary perspective view of the compartments into which the reinforcing solution and the solution to be reinforced are introduced and their overflow weirs.

Fig. 8 is a fragmentary vertical section, taken on line 8—8, Fig. 9.

Figs. 9 and 10 are horizontal sections, taken on the correspondingly numbered lines on Fig. 6.

In its general organization this invention comprises a tube containing a hydrometer through which the solution to be reinforced is passed at a constant rate of flow and maintained at a fixed level so that the hydrometer will rise or fall in accordance with the specific gravity of the solution and without being influenced by its flow. The falling of the hydrometer operates a switch which controls an electrical circuit operating to admit a highly concentrated brine solution to the solution to be reinforced. A part of this concentrated solution is admitted to the inlet of the hydrometer tube and a part is admitted beyond the outlet or overflow of this tube so as to avoid excessive hunting of the apparatus since otherwise the admission of the complete charge of the high strength solution would cause the hydrometer to rise excessively and then settle back excessively after the charge had passed. The control of the flows of the solution to be reinforced and the reinforcing solution, including their mixture and separation, is effected by a simple series of overflow weirs. Means are also provided for adjusting the elevation of the switch and thereby adjust the strength of the solution which the apparatus will maintain and means are also provided for indicating both the setting of the apparatus and also the strength of the solution passing through it so that the operator can instantly observe the condition of the solution and the condition of the apparatus.

The brine solution to be maintained at a predetermined strength is shown as contained in a tank 10, although it will be understood that the tank 10 is purely representative of a source of brine solution in an apparatus where the brine is subject to dilution. The solution is withdrawn from the tank 10 by means of a constantly operating pump 11, the outlet pipe 12 of which delivers the brine into a bowl-like receptacle 13. The brine is also withdrawn from this bowl-like receptacle 13 through a conduit 14 which returns the brine by gravity to the tank 10. In this bowl-like receptacle a plurality of partitions are provided which divide it into a plurality of compartments for a purpose which will presently appear.

The numeral 15 represents one of these partitions, this partition extending across the bowl-shaped receptacle 13 and dividing it into a large compartment 16 drained by the return pipe 14 and a smaller compartment which is in turn subdivided by a high partition 17 extending along the wall of the receptacle 13 and at right angles to the partition 15 and connected to the partition 15 by divergent partitions 18 and 19. The partitions 15, 17, 18 and 19 thereby provide, in addition to the large chamber 16, a chamber 20 into the bottom of which the pipe 12 from the pump 11 discharges; a compartment 21 into which the reinforcing highly concentrated brine solution from a tank 22 is discharged through a pipe 23 under control of a solenoid valve 24; and a compartment 25 into which the solutions from the chambers 20 and 21 overflow. As best shown in Figs. 7 and 8 these partitions are formed to provide overflow weirs of different heights. The partition 19 provides the lowermost overflow weir 27 located between the compartments 20 and 25. The partition 15 is formed to provide the next higher overflow weir 28 between the compartments 25 and 16. The partition 15 is formed to provide the next higher overflow weir 30 between the compartments 20 and 16. The partition 18 is formed to provide the next higher overflow weir 29 between the compartments 21 and 25 and the partition 15 is also formed to provide the highest overflow weir 31 between the compartments 21 and 16. The partition 17 is merely a divider and consequently extends substantially higher than the overflow weir 31.

The bowl-like receptacle 13 is principally supported by a hydrometer tube 35 which extends through the bottom of the vessel 13 so as to provide an overflow rim 36, this rim being located a predetermined distance below the overflow weir 28. To connect the hydrometer tube and the bowl-like receptacle 13 a flange 37 is provided on the hydrometer tube on which the bowl-like receptacle 13 is secured and the lower end of the hydrometer tube 35 is secured to a casting 38 which serves as a base and is also formed to provide a conduit 39 connecting the lower end of the hydrometer tube 35 with the lower end of a tube 40. The upper end of the tube 40 is secured to the bottom of the bowl-like receptacle 13 and communicates with an orifice 41 in the bottom of the chamber 25. Between the upper end of the tube 40 and the orifice 41 a small washer 42 is interposed, this washer having a small orifice 43 of predetermined size. A drain cock 44 is provided in the casting 38, as best shown in Fig. 6.

Floating in the hydrometer tube is a sealed hydrometer 45 which is preferably of sufficient size and weight as to be unaffected by the addition of small weights thereto. This hydrometer is preferably in the form of a hollow tube having a pointed bottom 46 filled with lead 47 which in turn supports a suitable amount of sand 48. The upper end of the hydrometer is sealed by a cap 49, this cap carrying a plurality of small upright legs 50 supporting a small ring 51.

This ring 51 is shown as seating a half round adjusting member 55 carrying a vertical internally threaded stem 56 in which a control rod 57 is screwed. This rod extends up through an opening 58 in a cover plate 59 for the bowl-shaped receptacle 13. The upper end of the rod 57 extends into a cylindrical casing 60 having a closed top 61 and containing the electrical control mechanism. In order to prevent any vapors containing brine from being carried from the interior of the receptacle 13 to the interior of the casing 60 the orifice 58 preferably fits snugly around the screw 57 and the front wall of the casing 60 is indented to form a pocket 62 so that any vapors passing the orifice 58 are carried to the atmosphere instead of to the interior of the casing 60.

The front wall of the casing 60 is suitably formed to provide a window preferably glazed with a pane 65 of frosted or opalescent glass. As best shown in Fig. 1 this glass is provided with a series of vertical graduations 66 indicating different degrees of brine strength. The reading of the hydrometer 45 is indicated on the scale 66 by means of a pointer 70 mounted on a rod 71 carried by the screw rod 57 of the hydrometer and casting a shadow against the ground glass pane 65, as indicated in Fig. 1. By the provision of an electric light within the casing 60 it will be seen that this shadow enables the operator to instantly read the strength of the solution passing up through the hydrometer tube 35.

A horizontal supporting plate 75 in the form of a casting is suitably secured within the casing 60 and is shown as rotatably supporting three screws 76 by means of collars 77 on the screws, these screws extending vertically. At its lower end each of the screws 76 carries a pinion 78, these pinions meshing with a gear 79, this gear 79 being also formed to provide a worm wheel 80 and being rotatably secured to the underside of the supporting plate 75 in any suitable manner. This worm wheel 80 is turned by a worm 81 on a horizontal shaft 82 which is journaled in horizontal bearings 83 provided in the supporting plate, as best shown in Fig. 4, and extends externally of the casing 60. At its outer end the worm shaft 82 is provided with a knob 84 by means of which the shaft 82 is turned to rotate the worm, worm wheel, gears and pinions and turn the screws 76 in unison.

The screws 76 have threaded engagement with a vertically movable platform 85 so that the turning of these screws raises and lowers this platform. This platform 85 is preferably made of hard rubber or other non-conducting material and is formed to provide a knife edge 86 supporting a rocker arm or plate 87 which carries a Mercoid switch 88. The Mercoid switch 88 is preferably mounted at the rear of the rock arm 87 so that its front end is normally elevated, the screw rod 57 of the hydrometer passing up through an opening in the platform 85 and an opening 89 at the front end of the rock arm 87. A small metal cap 90 is arranged over the upper end of the screw rod 57 and the opening 89 in the rock arm 87. The weight of this cap 90 is sufficient to overbalance the Mercoid switch 88 and it will be seen that when the hydrometer drops this cap 90 is deposited on the front end of the rock arm 87 so as to depress the front end of the Mercoid switch 88. As the hydrometer rises its rod 57 lifts the cap 90 from the rock arm 87 whereupon the weight of the Mercoid switch 88 causes the rock arm 87 to tilt to the position shown in Fig. 7. The purpose of providing the removable cap 90 is to permit of adjusting the platform 85 vertically to any position regardless of the position of the hydrometer and its rod 57. Thus it will be seen that the platform 85 can be moved either to the extreme upper or lower part of the screws 76, a condition that would not obtain if the means for operating the switch from the screw rod 57 were other than impositive.

The position of adjustment of the platform 85 determines the point at which the hydrometer will operate the Mercoid switch 88 to admit or cut off the supply of reinforcing solution from the tank 22. Hence the position of this platform determines the strength of the solution which the apparatus will maintain. This strength is indicated on the scale 66 by a pointer 95 carried by a rod 96 projecting up from the platform 85 and casting a shadow on the opposite side of the glass pane 65 from that cast by the pointer 70.

The Mercoid switch, as best shown in Fig. 5, is provided with a forward contact 100, a rear contact 102 and a branched central contact 103. When the rear end of the rock arm 87 is depressed, the globule of mercury within the Mercoid switch connects the contacts 102 and 103 and establishes a circuit from a main power line 104 through a line 105 and green light G to the other side 106 of the line. This green light G is mounted on the platform 85 and a reflecting partition 107 is mounted on the platform between the green light and the switch so that the green light from the bulb G is cast as a vertical band on the left hand side of the ground glass plate 65, as viewed in Fig. 1. When the front end of the rock arm 87 is depressed a circuit is established from the side 104 of the power line, through contacts 103, 100, line 108, solenoid valve 24 and line 109 to the other side 106 of the line, thereby opening the valve 24 and permitting concentrated brine to be admitted to the solution to be reinforced. At the same time current passes from the line 108 through line 110, red light R and line 111 to the other side 106 of the line. This red light R is mounted on the right hand side of the table 85, as viewed in Fig. 3, and to one side and in advance of a reflective partition 112, so that its light is cast as a vertical red band upon the extreme right hand side of the ground glass pane 65, as viewed in Fig. 1. A white light W is connected across the lines 104 and 106 and this light is mounted on the platform 85 between the partitions 107 and 112 so that at all times the scale 66 and the shadows cast by the pointers 70 and 95 are visible. It will therefore be seen that the operator can at all times see whether the solution passing through the apparatus is above or below that which the apparatus is set to maintain by observing the relative positions of the shadows cast by the pointers 70 and 95 upon the ground glass and that by this means he can determine to what extent the brine solution is above or below the strength desired and also the setting of the apparatus. It will further be seen that by the provision of the red and green lights R and G he can determine at a great distance whether the brine solution is above or below the setting since the red light R will cast a red band on the glass plate 65 when the passing solution is below strength and this will be extinguished and the green light G cast a green band on this glass plate when the solution is above strength.

Obviously a motor operated pump could be substituted for the solenoid valve 24.

*Operation*

In the operation of the apparatus the operator turns the knob 84 to adjust the indicator 95 along the scale 66 to obtain the desired strength of brine solution. Turning this knob 84 through the shaft 85, worm 81, worm gear 80, gear 79 and pinions 78 rotates, in unison, the screws 76 so as to elevate or lower the hard rubber platform 85. Since the pointer 95 is carried by this platform this pointer is shifted upwardly or downwardly on the scale 66, the shadow of this pointer being cast upon this scale by the white light W so that it can be set to any desired graduation thereon.

The pump 11 is continuously operated and withdraws the brine to be reinforced from the tank 10 and delivers it through the pipe 12 to the bottom of the compartment 20. The pump 11 supplies the brine in sufficient quantity to overflow both the weir 27 and the weir 30, that overflowing the weir 27 entering the compartment 25 and passing through the restricted orifice 43 in the washer 41 into the tube 40. This brine passes through the conduit 39 in the base 38 and fills the hydrometer tube 35 until it overflows into the compartment 16 where it is joined by that excess brine overflowing the weir 30 and passes out through the pipe 14 back to the tank 10. The restricted orifice 43 in the washer 42 is of such reduced size that the compartment 25 is filled to overflowing, this overflow passing over the weir 28 and passing out through the bottom of the compartment 16 and return pipe 14. Since the height of the weir 28 is a fixed distance above the overflow rim 36 of the hydrometer tube 35 and since the restricted orifice 43 is of a definite size it will be seen that a constant upward flow of brine in the hydrometer tube 35 is maintained and that therefore the influence of this flow upon the hydrometer 45 is constant. Therefore, by this overflow arrangement and the provision of an orifice of constant size variations in the action of the hydrometer through variations in flow of the brine in which it is submerged is avoided and an accurate control obtained.

Assuming that the brine from the tank 10 is at a concentration less than the setting of the pointer 95 on the scale 66, the hydrometer 45 will sink thereby causing the screw rod 57 to deposit the small cap 90 on and depress the front end of the rock or trip arm 87. This breaks the circuit through the contacts 102 and 103 of the Mercoid switch 88 and establishes a circuit through the contacts 100 and 103. The green light G is thereby extinguished and the red light R lit through the circuit comprising the side 104 of the power line, contacts 103 and 100, lines 108 and 110, red light R and line 111 to the other side 106 of the power line. A vertical red band of light thereby appears at the right side of the ground glass pane 65, as viewed in Fig. 1, so that the operator can see at a distance that the brine passing through the apparatus is at a concentration below the setting of the pointer 95. Since the hydrometer 45 is relatively deeply immersed in the dilute brine, the pointer 70 carried by its rod 57 will be below the setting of the pointer 95 and indicates the exact degree of concentration of the brine. Therefore the operator can instantly determine by observing the glass pane 65 that the brine is dilute; the concentration desired; and the concentration of the brine at the time of the reading.

The closing of the contacts 100 and 103 also establishes a circuit from the side 104 of the main power line through the closed contacts 100, 103, line 108, solenoid valve 24, and line 109 to the other side 106 of the main power line. This opens the valve 24 and permits saturated brine to flow from the tank 22 and line 23 into the bottom of the compartment 21 to reinforce the dilute brine from the tank 10. The saturated brine fills the compartment 21 and overflows both the weir 29 and the weir 31. That overflowing the weir 31 falls into the compartment 16 and flows out through the return line 14 to the tank 10 along with the dilute brine overflowing the rim 30 of the hydrometer tube 35 and the dilute brine overflowing the weirs 27, 28 and 30. A negligible amount of the saturated brine overflowing the weir 29 may flow over the weir 28 with the dilute brine, but since the weir 29 is higher than the weir 27, the greater fall of the saturated brine carries the preponderance of the saturated brine below the surface of the dilute brine filling the compartment 25 so that substantially all of this concentrated brine overflowing the weir 29 passes to the bottom of the compartment 25 and out through the restricted orifice 43. It will also be seen that the turbulence created in the compartment 25 causes a thorough mixture of the dilute and saturated brine. The reinforced brine in the bottom of the compartment 25 flows down through the restricted orifice 43, tube 40, across the conduit 39 and up the hydrometer tube 35, overflowing the rim 30 into the compartment 16 and draining out the pipe 14 back to the tank 10.

Since the brine flowing through the hydrometer tube 35 is reinforced by the saturated brine, the hydrometer 45 rises and its screw rod 57 lifts the cap 90 from the rock arm 87, as illustrated in Fig. 1, whereby the preponderating weight of the Mercoid switch 88 depresses the rear end of the rock arm 87. This tilts the Mercoid switch so that the globule of mercury travels to the rear end and breaks the circuit through the contacts 100, 103 and establishes a circuit through the contacts 102 and 103. This tilting of the Mercoid switch thereby extinguishes the red light R and closes the solenoid valve 24, these being in circuit with the now open contacts 100 and 103. The flow of brine from the tank 22, line 23 and solenoid valve 24 to the bottom of the compartment 21 is thereby cut off and the vertical band of red light at the right of the glass pane 65 disappears.

The closing of the contacts 102 and 103 establishes a circuit through the green light G so that a vertical band of green light appears at the left hand side of the panel 65 and the operator knows that the brine flowing through the hydrometer tube 35 is at a concentration higher than the setting of the pointer 95. The rising of the hydrometer 45 to lift the cap 90 from the rock arm 87 carries the pointer 70 above the setting of the pointer 95 so that the operator can determine the exact degree of excess by comparing the shadows cast by the pointers 70 and 95 on the ground glass pane 65 and also the exact degree of salinity of the brine flowing through the hydrometer tube 35. The white light W is connected across the main power line and is therefore always lit to permit of reading the scale 66.

The cutting off of the overflow of saturated brine into the compartment 25 results in a gradual weakening of the solution flowing up through the hydrometer tube 35 and hence the hydrometer 45 gradually settles until it redeposits the cap 90 on the rock arm 87 and tilts the Mercoid switch 88 to again open the solenoid valve 24, extinguish the band of green light and light the band of red light. The admission of the saturated brine thereupon causes the hydrometer to rise and repeat the cycle of operations described. When the salinity of the solution in the tank 10 has been established at or near the setting of the finger 95 on the scale 66, the amount of such hunting is very slight. This hunting is further reduced by the fact that a good proportion of the reinforcing solution admitted overflows the weir 31 and hence has no immediate effect on the hydrometer 45 while at the same time building up the strength of the solution in the tank 10. It will be appreciated that if all the concentrated solution were admitted, say, directly to the tube 40, the hydrometer 45 would be driven up excessively high by the sudden and large charge of saturated brine and would then sink abnormally low after its sudden rise cutting off the flow of reinforcing solution. Such a condition would not only make the apparatus less sensitive and accurate but would render it less susceptible to accurate observation and result in greater wear.

From the foregoing it will be seen that the apparatus is readily adjustable since all the operator need do is to turn the knob 84 until the shadow of the pointer 95 is brought to the desired point on the scale 66; the operation of hydrometer 45 is accurate since the fixed difference in the heights of the overflow weir 28 and the rim 36 insures an exact level in the body in which the hydrometer floats; the accuracy of the hydrometer is further insured by its large size and weight and also by the fact that an upward flow of constant velocity is maintained in the hydrometer tube by the constant head imposed thereon and by the fixed size of the submerged orifice 43; the apparatus will control the salinity of very large volumes of brine without excessive hunting because only a part or sample of the reinforcing solution has a direct effect on the hydrometer, the balance being passed directly to the main body of the solution to be reinforced; the provision of red and green lights synchronized with the operation of the hydrometer facilitates supervision of the apparatus and the provision of the pointer 70 on the hydrometer in coaction with the adjusting pointer 95 permits of very accurate determination of the operation of the apparatus; the provision of the removable cap 90 to overbalance the rock arm 87 provides a very simple means of securing any desired adjustment of the elevation of the Mercoid switch and pointer 95 regardless of the elevation of the screw rod 57 on the hydrometer; the electrical parts housed within the casing 60 are adequately protected against the corrosive effect of the solutions handled and the apparatus is at the same time simple and compact in construction and will stand up under severe use without getting out of order or requiring repairs.

While I have described the invention in connection with brine it will be understood that the apparatus can be used for any solution where it is desired to maintain a predetermined density. It will also be appreciated, of course, that the apparatus could be used to dilute the solution by admitting a diluent instead of a highly concentrated solution. The invention is therefore not to be regarded as limited to the precise disclosure made but is to be accorded the full range of equivalents comprehended by the following claims.

I claim as my invention:

1. Apparatus for regulating the density of solutions, comprising a hydrometer chamber having an overflow at a predetermined height, an inlet admitting the solution to be regulated to said hydrometer chamber, means for maintaining a constant head of said solution on said inlet comprising a compartment having an overflow located at a higher level than the overflow of said hydrometer chamber and a conduit connecting said compartment and said inlet, said conduit providing a uniform velocity of the solution through said inlet, means for admitting an excess of the solution to be regulated to said compartment, said excess overflowing said compartment, a hydrometer in said chamber and floating in said solution and means responsive to the vertical movement of said hydrometer for admitting a medium to said solution to alter its specific gravity.

2. Apparatus for regulating the density of solutions, comprising a hydrometer chamber having an overflow at a predetermined height, an inlet admitting the solution to be regulated to said hydrometer chamber, means for maintaining a constant head of said solution on said inlet comprising a compartment having an overflow located at a higher level than the overflow of said hydrometer chamber and a conduit connecting said compartment and said inlet, said conduit providing a uniform velocity of the solution through said inlet, means for admitting an excess of the solution to be regulated to said compartment, said excess overflowing said compartment, conducting means providing a common return for the overflows of said hydrometer chamber and compartment to the source of said solution, a hydrometer in said chamber and floating in said solution and means responsive to the vertical movement of said hydrometer for admitting a medium to said solution to alter its specific gravity.

3. Apparatus for regulating the density of solutions, comprising an overflow receptacle having a drain returning the solution to its source, a hydrometer tube extending through the bottom of said receptacle and overflowing therein, a compartment in said receptacle and having a weir overflowing therein and located above the level of the top of said hydrometer tube, a restricted conduit leading from said receptacle to said hydrometer tube, means for admitting an excess of the solution to be regulated to said compartment, a hydrometer in said hydrometer tube and floating in said solution and means responsive to the vertical movement of said hydrometer for admitting a medium to said solution to alter its specific gravity.

4. Apparatus for regulating the density of solutions, comprising a hydrometer chamber having an overflow at a predetermined height, an inlet admitting the solution to be regulated to said chamber and arranged below said overflow, means for maintaining a constant head of solution on said inlet, said head being higher than said overflow to provide a uniform velocity through said inlet, a hydrometer in said chamber and floating in said solution, means responsive to the vertical movement of said hydrometer for admitting a medium to said solution in two streams to alter its specific gravity, one of said streams being admitted to said means for maintaining a constant head of solution and the other of said streams being admitted to the solution at a point beyond the overflow of said hydrometer chamber.

5. Apparatus for regulating the density of solutions, comprising a hydrometer chamber having an overflow at a predetermined height, an inlet admitting the solution to be regulated to said hydrometer chamber and arranged below said overflow, means for maintaining a constant head of said solution on said inlet comprising a compartment having an overflow located at a higher level than the overflow of said hydrometer chamber and a conduit connecting said compartment and said inlet, said conduit providing a uniform velocity of the solution through said inlet, means for admitting an excess of the solution to be regulated to said compartment, said excess overflowing said compartment, a hydrometer in said chamber and floating in said solution, means responsive to the vertical movement of said hydrometer for admitting a medium to said solution to alter its specific gravity and including a second compartment supplied with said medium arranged alongside said first compartment and having one weir overflowing into said first compartment and a second weir overflowing at another place and means for returning the overflows from said first and second compartments and said hydrometer chamber to the source of said solution to be regulated.

6. Apparatus for regulating the density of solutions comprising an overflow receptacle having a drain returning the solution to its source, a hydrometer tube extending through the bottom of said receptacle and overflowing therein, a compartment in said receptacle and having a weir overflowing therein and located above the level of the overflow of said hydrometer tube, a conduit connecting said compartment with the lower part of said hydrometer tube, a second compartment arranged alongside said first compartment and having a weir overflowing into said first compartment and another weir overflowing into the bottom of said receptacle, means for admitting an excess of the solution to be regulated to said second compartment to overflow its weirs and admit an excess to said first compartment, a hydrometer in said hydrometer tube and floating in said solution, means responsive to the vertical movement of said hydrometer for admitting a medium to said solution to alter its specific gravity and including a third compartment having a weir overflowing into said first compartment and a second weir overflowing into the bottom of said receptacle.

7. Apparatus for regulating the density of solutions comprising an overflow receptacle having a drain returning the solution to its source, a hydrometer tube extending through the bottom of said receptacle and overflowing therein, a compartment in said receptacle and having a weir overflowing therein and located above the level of the overflow of said hydrometer tube, a conduit connecting said compartment with the lower part of said hydrometer tube, a second compartment arranged alongside said first compartment and having a weir overflowing into said first compartment and another weir overflowing into the bottom of said receptacle, means for admitting an excess of the solution to be regulated to said second compartment to overflow its weirs and admit an excess to said first compartment, a hydrometer in said hydrometer tube and floating in said solution, means responsive to the vertical movement of said hydrometer for admitting a medium to said solution to alter its specific gravity and including a third compartment having a weir overflowing into said first compartment and a second weir overflowing into the bottom of said receptacle, said weirs being of different heights, the weir between said first and second compartment being the lowest, the weir between said first compartment and said receptacle being the next higher, the weir between said first and third compartments being the next higher and the weir between said third compartment and said receptacle being the highest.

8. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity, and including a trip member arranged adjacent said hydrometer and arranged to be tripped thereby and means for adjusting the elevation of said trip member relative to the level of said solution thereby to adjust the solution density maintained by said hydrometer.

9. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a switch arranged adjacent said hydrometer and tripped thereby, means in circuit with said switch for starting and stopping the flow of said medium and means for adjusting the elevation of said switch relative to said fixed level thereby to alter the density of the solution maintained by said hydrometer.

10. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a platform arranged adjacent said hydrometer, a switch carried by said platform, said switch being tripped by the vertical movement of said hydrometer, means in circuit with said switch for starting and stopping the flow of said medium and means for adjusting the elevation of said platform thereby to adjust the density of the solution maintained by said hydrometer.

11. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a platform arranged adjacent said hydrometer, a trip arm carried by said platform and normally having one end depressed, means actuated by said trip arm for starting and stopping the flow of said medium, a rod projecting upwardly from said hydrometer, a weight carried at the upper end of said rod and arranged to be deposited on the elevated end of said trip arm as said hydrometer sinks, said weight being sufficient to depress said elevated end of said trip arm and means for adjustably regulating the height of said platform thereby to regulate the strength of the solution maintained by said hydrometer.

12. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a platform arranged adjacent said hydrometer, a trip member carried by said platform, means actuated by said trip member for starting and stopping the flow of said medium, means carried by said hydrometer for tripping said trip member in response to the vertical movement of said hydrometer, a pointer carried by said last means, a fixed scale traversed by said pointer, means for adjusting the vertical position of said platform to regulate the density of the solution maintained by said hydrometer and a pointer carried by said platform and traversing said scale.

13. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a platform arranged adjacent said hydrometer, a switch carried by said platform, means actuated in response to the vertical movement said hydrometer for tripping said switch, means in circuit with said switch for starting and stopping the flow of said medium, a pair of electric lamps of different colors mounted on said platform and in circuit with said switch and lit alternately as said switch is moved from one position to the other by said hydrometer and means for adjusting the elevation of said platform thereby to regulate the density of solution maintained by said hydrometer.

14. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including a casing above said hydrometer having a window, a glass pane in said window carrying a vertical scale, a platform arranged in said casing, a switch carried by said platform, a rod extending upwardly from said hydrometer and arranged to trip said switch in response to the vertical movement of said hydrometer, means in circuit with said switch for starting and stopping the flow of said medium, means for adjusting the elevation of said platform thereby to adjust the density of solution maintained by said hydrometer, a pointer carried by said platform and traversing said scale, a pointer carried by said rod and traversing said scale and a pair of lamps of contrasting colors carried by said platform and arranged in circuit with said switch to be alternately lit as said switch is moved form one position to the other in response to the movement of said hydrometer.

15. Apparatus for regulating the density of solutions, comprising a hydrometer chamber, means for passing the solution to be regulated through said chamber, means for maintaining a fixed level of the solution in said chamber, a hydrometer in said chamber and floating in said solution, means responsive to the vertical movement of said hydrometer for admitting a medium to said solution to alter its specific gravity and including an electrical control element arranged adjacent said hydrometer and arranged to be actuated by the movement of said hydrometer and means for adjusting the elevation of said control element relative to the level of said solution thereby to adjust the solution density maintained by said hydrometer.

16. Apparatus for regulating the density of solutions comprising a hydrometer chamber having an outlet, means for passing a portion of the solution to be regulated through said chamber and the balance to a point beyond said outlet, means for maintaining a fixed level of the solution in said chamber, a hydrometer in said chamber and floating in said solution, means responsive to the movement of said hydrometer for admitting a medium to said solution to alter its specific gravity, means for conducting a part of the medium so admitted directly to said chamber and means for conducting the balance of the medium so admitted to the balance of said solution at the point beyond the outlet of said chamber.

FREDERICK WALTER THOROLD.